US00RE38140E

(19) United States
(12) Reissued Patent
Schaffer

(10) Patent Number: US RE38,140 E
(45) Date of Reissued Patent: Jun. 10, 2003

(54) DUAL INTERLEAVED DC TO DC SWITCHING CIRCUITS REALIZED IN AN INTEGRATED CIRCUIT

(75) Inventor: Gregory L. Schaffer, Cupertino, CA (US)

(73) Assignee: Maxim Integrated Products, Inc., Sunnyvale, CA (US)

(21) Appl. No.: 09/781,120

(22) Filed: Feb. 8, 2001

Related U.S. Patent Documents

Reissue of:
(64) Patent No.: 5,870,296
Issued: Feb. 9, 1999
Appl. No.: 08/949,463
Filed: Oct. 14, 1997

(51) Int. Cl.[7] ..... H02M 7/00
(52) U.S. Cl. ..... 363/65; 323/282
(58) Field of Search ..... 363/17, 65, 21.1, 363/21.18

(56) References Cited

U.S. PATENT DOCUMENTS

| | | | | |
|---|---|---|---|---|
| 3,913,000 A | | 10/1975 | Cardwell, Jr. | |
| 4,371,919 A | * | 2/1983 | Andrews et al. | 363/65 |
| 4,384,321 A | | 5/1983 | Rippel | |
| 4,489,370 A | * | 12/1984 | Migliori | |
| 4,618,919 A | | 10/1986 | Martin, Jr. | |
| 4,748,397 A | | 5/1988 | Ogawa et al. | |
| 5,247,239 A | | 9/1993 | Yamamura et al. | |
| 5,477,132 A | | 12/1995 | Canter et al. | |
| 5,583,753 A | * | 12/1996 | Takayama | |
| 5,604,669 A | * | 2/1997 | Strong, III | |
| 5,684,683 A | * | 11/1997 | Divan et al. | 363/65 |
| 5,719,491 A | * | 2/1998 | Kolanko et al. | |
| 5,737,202 A | * | 4/1998 | Shimamori | 363/65 |
| 5,764,007 A | * | 6/1998 | Jones | |
| 5,781,421 A | * | 7/1998 | Steigerwald et al. | |

FOREIGN PATENT DOCUMENTS

| | | |
|---|---|---|
| EP | 0 310 858 | 4/1989 |
| EP | 0 369 954 | 5/1990 |

OTHER PUBLICATIONS

Thompson, R., "High–frequency silicon–controlled–rectifier sinusoidal inverter", Proceedings of the Inst. of Electrical Engineers, Apr. 1963, pp. 647–652, vol. 110, No. 4.

Garth, D.R. et al., "Multi–Phase, 2–Kilowatt, High–Voltage, Regulated Power Supply", IEEE Power Conditioning Specialists Conference Record, 1971, pp. 110–116.

(List continued on next page.)

*Primary Examiner*—Adolf Deneke Berhane
(74) *Attorney, Agent, or Firm*—Blakely, Sokoloff, Taylor & Zafman LLP

(57) ABSTRACT

Dual interleaved DC to DC switching circuits realizable in an integrated circuit form, capable of monitoring individual inductor current using only one current sense resistor and providing automatic duty cycle adjustment to keep the inductor currents in the interleaved DC to DC switching circuits balanced. The preferred embodiment includes a gain error amplifier, an integral error amplifier, and a differentiator error amplifier and circuits for controlling the nominal duty cycle, with the gain error amplifier, integral error amplifier and differentiator error amplifier being adjustable independently by external components. The circuit further includes a high speed load regulation circuit that momentarily overrides the control circuitry to take over control of the interleaved converters during sudden load changes, such control also being programmable. The circuit further includes a load variation circuit to target the output voltage of the circuit to an optimal value with load to better keep the output voltage within a targeted range in the event of major step changes in the load. The disclosed embodiment is for two interleaved buck converters, though the principles of the invention are applicable to interleaved step up converters and the interleaving of more than two converters.

63 Claims, 4 Drawing Sheets

OTHER PUBLICATIONS

Rippel, Wally E., "Optimizing Boost Chopper Charger Design", Proceedings of the Sixth National Solid–State Power Conversion Conference, 1979, pp. D1–1 to D1–20.
NASA Technical Briefs No. MFS–28387, "Low–Inductance Wiring for Parallel Switching Transistors", Mar. 1979, pp. 1–6.
Rippel, Wally E., "A New Coupled Inductor Two–Phase Switching Regulator Improves Device Utilization", Proceedings of PowerCon 7, 1980, pp. E2–1 to E2–13.
Hedel, Kurt K., "High–Density Avionic Power Supply", IEEE Transactions on Aerospace and Electronics Systems, Sep. 1980, pp. 615–619, vol. AES–16, No. 5.
Lee, F.C. et al., "Investigations of Stability and Dynamic Performances of Switching Regulators Employing Current–Injected Control", IEEE Power Electronics Specialists Conference Record, 1981, pp. 3–16.
Shortt, D.J. et al., "A 600 Watt Four Stage Phase–Shifted–Parallel DC–to–DC Converter", IEEE Power Electronics Specialists Conference Record, 1985, pp. 136–143.
Nguyen, Vietson et al., "A Multiphase Topology of Series–Resonant DC–DC Converter", Power Conversion International Magazine, Mar. 1986, pp. 46–49.

Klaassens, J. Ben et al., "Phase–Staggering Control of a Series–Resonant DC–DC Converter with Paralleled Power Modules", IEEE Transactions on Power Electronics, Apr. 1998, pp. 164–173, vol. 3, No. 2.

Miwa, Brett A. et al., "High Efficiency Power Factor Correction Using Interleaving Techniques", IEEE Applied Power Electronics Conference Proceedings, 1992, pp. 557–568.

Miwa, Brett Andrew, "Interleaved Conversion Techniques for High Density Power Supplies", Doctoral Thesis, Massachusetts Institute of Technology, May 1992, pp. 1–193.

* cited by examiner

Vin
Rin
Lin
Cin
Rf
Cf
Rsense
L1
P1
N1
V
CS
CS
VOUT
Vin
P1
GND
N1
P
R8
R9
C5
C4
V2A
Q9
Q8
I3
R11
R13
R12
V2B
Vos
44
diff
FROM Q1
Q11
Q13
Q12
R14
VOSENSE
70
72
68
78
Q14
Q15
R15
V/2
VS
82
84
80
Cdiff
Vout
BIAS CURRENTS
IPTAT
ICONST
40
38
28
36
34
32
30
42
Pon
Non
26
24
DRV 1
A
B
Pon
Pon

DUAL INTERLEAVED DC TO DC SWITCHING CIRCUITS REALIZED IN AN INTEGRATED CIRCUIT

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to the field of DC to DC converters.

2. Prior Art

The preferred embodiment of the present invention pertains to DC-DC buck (step-down) converters. These are switching regulators that switch one end of an inductor between the input power supply and ground. The inductor spends $T_{ON}$ seconds connected to the input power supply and the remainder of the time connected to ground. If T is the total time for one cycle, then the output voltage (at the other end of the inductor), if filtered, will average $T_{on}/T \times V_{IN}$.

Filtering normally entails connecting a capacitor from the output side of the inductor to ground. The amount of ripple voltage at the output varies with $V_{IN}$, T, L, C and $V_{OUT}$.

A dual interleaved converter uses two buck converters running in parallel, but switched 180° out of phase. Thus halfway through the first cycle of one inductor, the second inductor is switched high (to $V_{IN}$). For given values of L and C, the dual interleaved converter has two advantages:

1. The ripple at the output is at least four times smaller than with the single inductor approach.
2. If designed to have the same ripple at the output, the dual-interleaved design has a response time to load changes that is at least eight times faster than the conventional design.

While dual interleaved converters are known in the prior art, such converters have not been realized in integrated circuit form because of various problems with dual interleaved converters which are not easily overcome in integrated circuit form, including but not limited to keeping inductor currents balanced.

BRIEF SUMMARY OF THE INVENTION

Dual interleaved DC to DC switching circuits realizable in an integrated circuit form, capable of monitoring individual inductor current using only one current sense resistor and providing automatic duty cycle adjustment to keep the inductor currents in the interleaved DC to DC switching circuits balanced are disclosed. The preferred embodiment includes a gain error amplifier, an integral error amplifier, and a differentiator error amplifier and circuits for controlling the nominal duty cycle, with the gain error amplifier, integral error amplifier and differentiator error amplifier being adjustable independently by external components. The circuit further includes a high speed load regulation circuit that momentarily overrides the control circuitry to take over control of the interleaved converters during sudden load changes, such control also being programmable. The circuit further includes a load variation circuit to target the output voltage of the circuit to an optimal value with load to better keep the output voltage within a targeted range in the event of major step changes in the load. The disclosed embodiment is for two interleaved buck converters, though the principles of the invention are applicable to interleaved step up converters and the interleaving of more than two converters.

DETAILED DESCRIPTION OF THE INVENTION

The preferred embodiment of the present invention is intended for use for a buck converter, and accordingly, the same will be described in detail with respect to such converters. However, it is to be understood that the principles of the present invention are also applicable to other types of converters, including step-up converters, as are also well known in the art.

Figures 1, 2D:
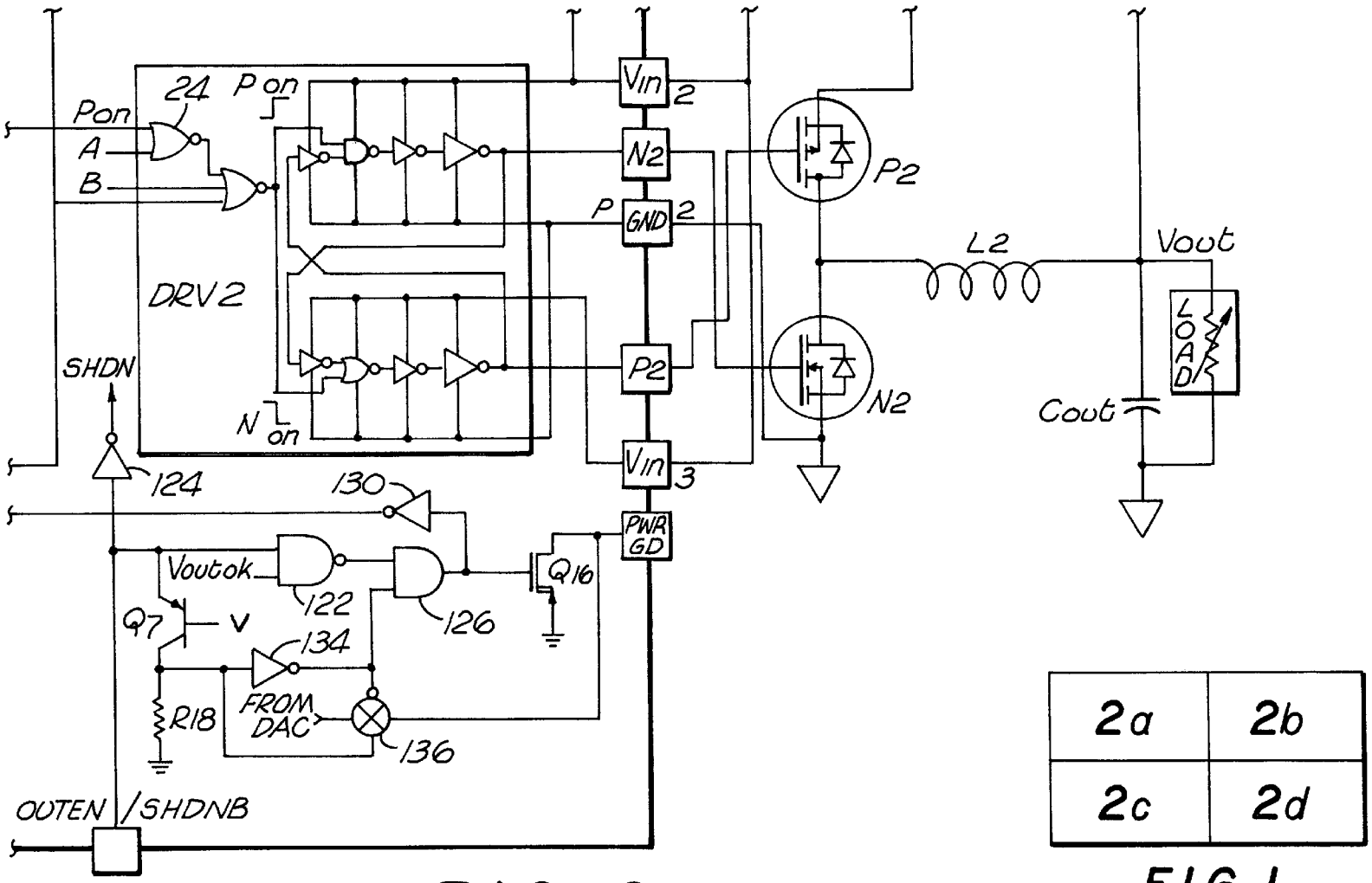
FIG. 1 illustrates the fitting together of FIGS. 2a through 2d to form the overall circuit of FIG. 2.
FIGS. 2a through 2d are circuit portions which, taken together, disclose one embodiment, namely the preferred embodiment, of the present invention.
Figure 2A:
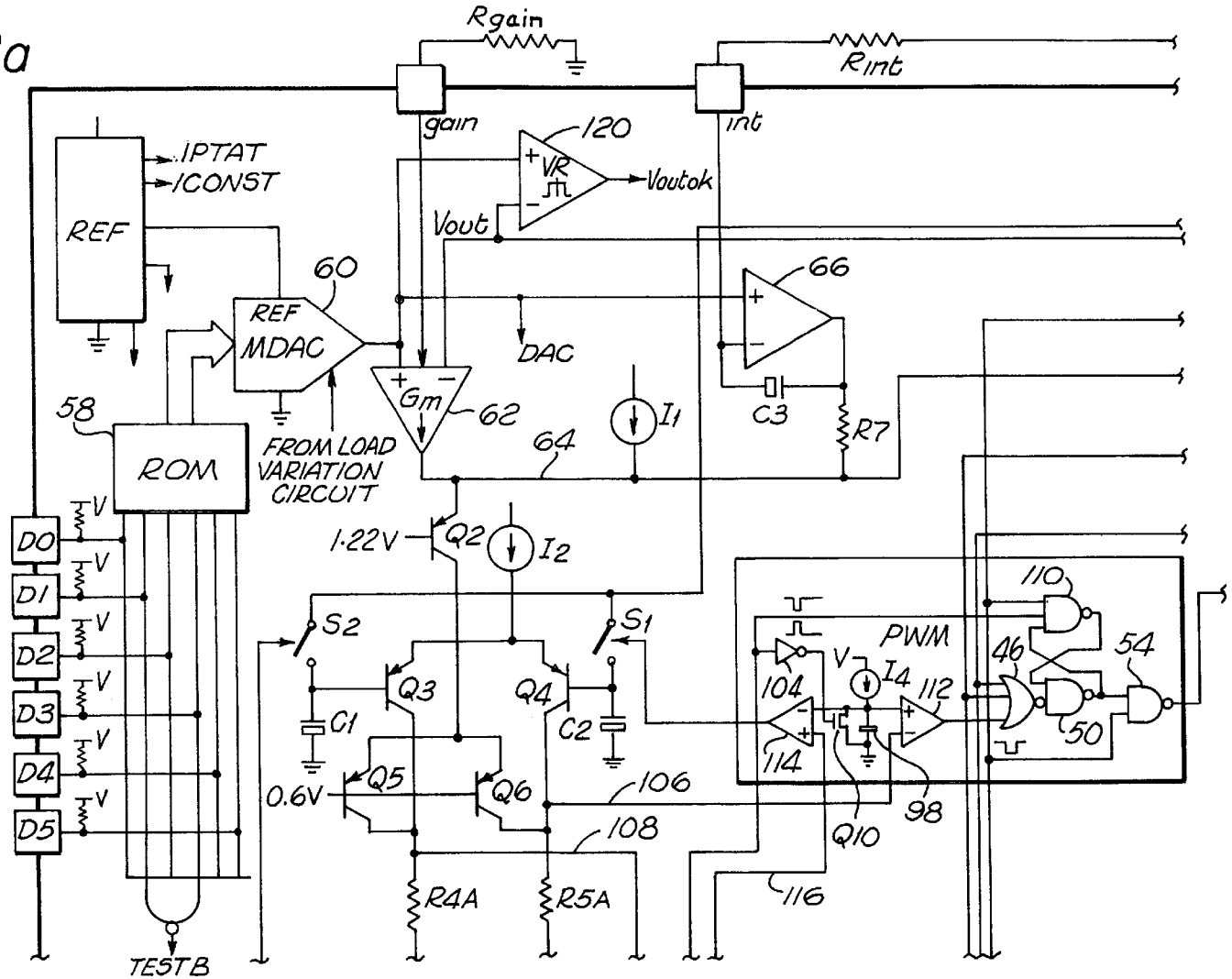
Figure 2B:
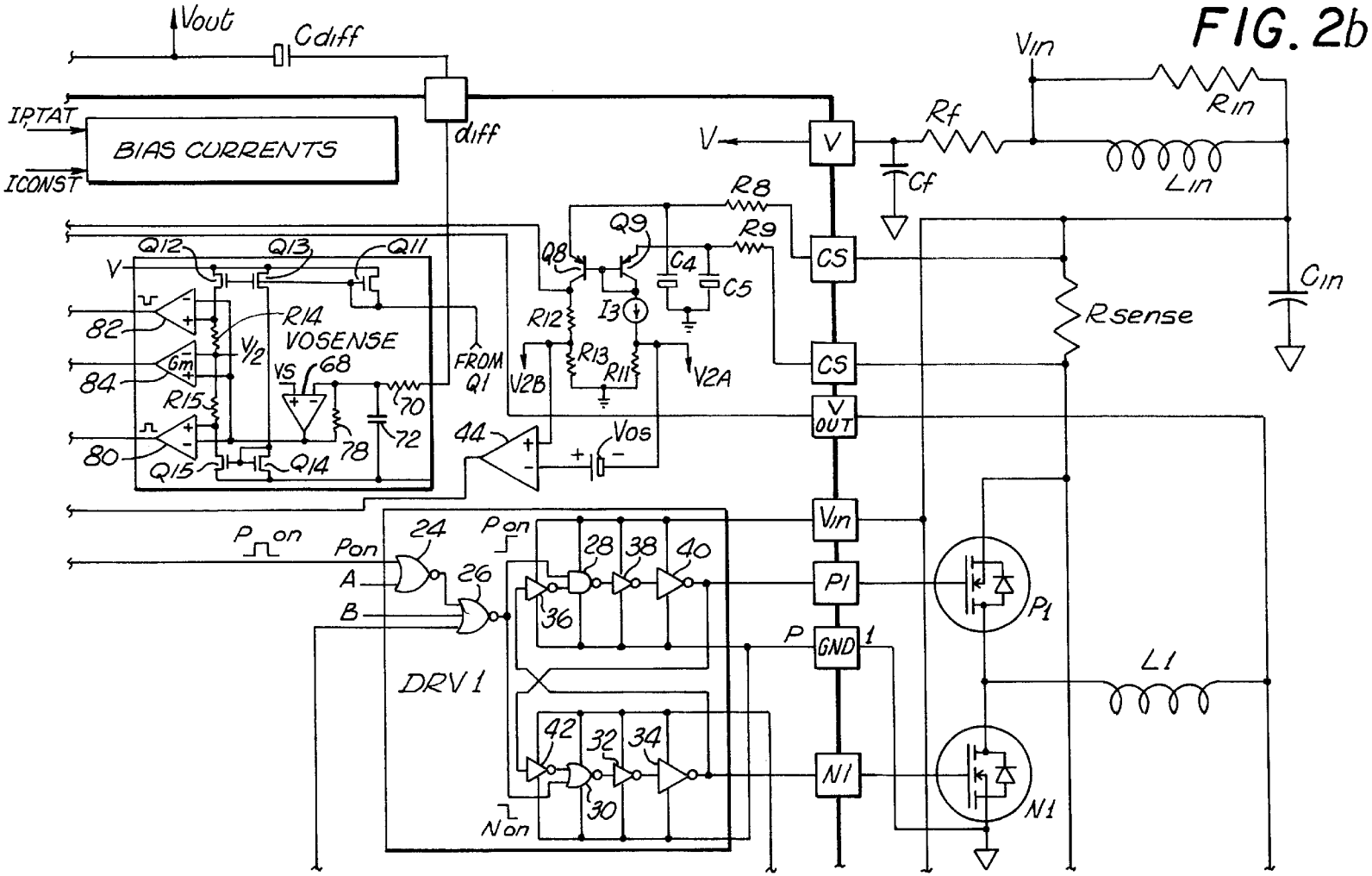
Figure 2C:
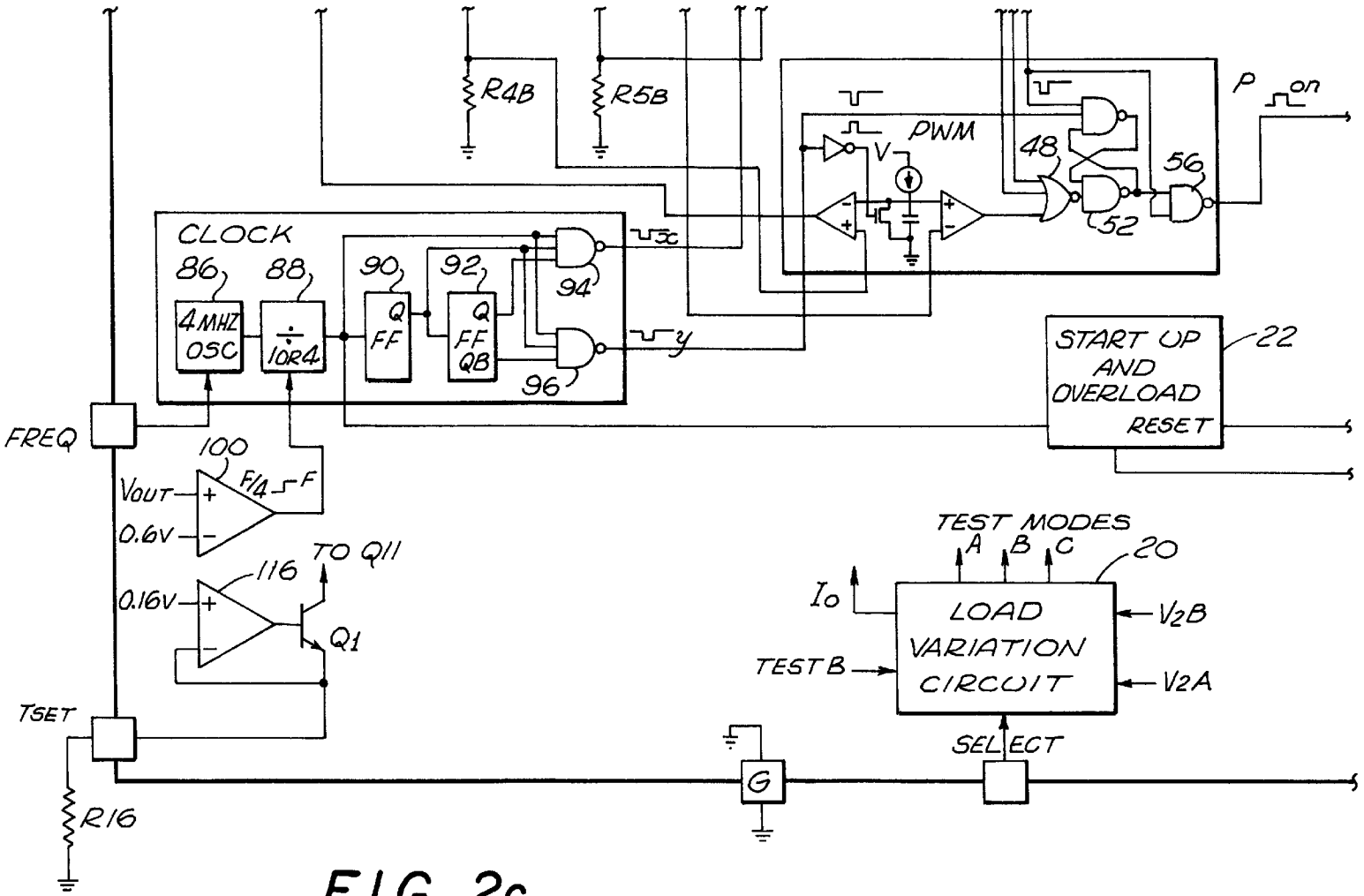

Now referring to FIG. 2, comprised of FIGS. 2a through 2d, a circuit diagram of the preferred embodiment may be seen. (FIGS. 2a through 2d are drawn in a proportion allowing the fitting together of the Figures in the manner illustrated in FIG. 1 to form the overall circuit of FIG. 2.) In this embodiment, the input voltage Vin is provided through optional resistor Rin and optional inductor Lin to capacitor Cin and the current sensing resistor Rsense. The resistor Rin, the inductor Lin and the capacitor Cin provide filtering of the switching noise to reduce the feedback of that noise to the power source of the input voltage Vin. Also, as shown in the figure, the input voltage Vin is provided through resistor Rf to provide an analog voltage V for powering the analog devices in the integrated circuit, more specifically the circuit components within the heavier line in FIG. 2 encircling the elements of the integrated circuit itself. Resistor Rf and capacitor Cf provide further high frequency filtering for the analog voltage, used for such purposes as to power the reference generator REF to generate a current proportional to absolute temperature IPTAT and a current substantially independent of temperature ICONST used by the bias current generator BIAS CURRENTS to provide the various bias currents used by the integrated circuit.

The current sense resistor Rsense is connected to the sources of p-channel devices P1 and P2, with the drains of those devices being connected to the drains of n-channel devices N1 and N2, respectively, and to one lead of inductors L1 and L2, respectively. The other connections of inductors L1 and L2 are connected in common to form the output voltage Vout, with output filter capacitor Cout providing filtering of the output for output noise reduction.

The gates of transistors P1 and N1, and P2 and N2, are controlled by gate drivers DRV1 and DRV2, respectively. These two gate drivers are identical, though as shall be subsequently seen, are driven out of phase with each other to provide the dual interleaved DC to DC switching. Referring specifically to gate driver DRV1, input signals A and B are signals representing test modes from load variation circuit 20. In normal operation, these signals will be low. Similarly, assume that the startup and overload circuit 22 is holding the reset signal RESET low. Thus, when the input to the driver Pon goes high, the output of NOR gate 24 will go low and the output of NOR gate 26 will go high. This drives one input of NAND gate 28 high and also one input of NOR gate 30 high. Driving one input of NOR gate 30 high drives the output of the NOR gate 30, and thus the input to inverter 32 low, driving the input to inverter 34 high, thus driving the output of inverter 34 low to turn off n-channel transistor N1. This low output of inverter 34 is also fed back as input to inverter 36, now driving the second input of NAND gate 28 high to drive the output thereof low, with inverters 38 and 40 inverting that signal twice to drive the gate of p-channel transistor low to turn on transistor P1. The low output of inverter 40 drives one input of NOR gate 30 high through inverter 42, which in effect holds the gate of transistor N1 low, regardless of the output of NOR gate 26. Thus it may be seen that the feedback of the output of inverters 40 and 34 through the circuit controlling the input to inverters 34 and 40, respectively, prevents the output of inverter 40 from going low when the output of inverter 34 is high, and similarly prevents the output of inverter 34 from going high when the output of inverter 40 is low. This then prevents transistors P1 and N1 from being turned on at the same time, even momentarily.

The voltage across the sense resistor Rsense is applied to the emitters of pnp transistors Q8 and Q9, with resistors R8 and R9 and capacitors C4 and C5 providing high frequency filtering of that voltage. Transistor Q9 is diode connected with the base and collector of the transistor coupled through current source I3 and resistor R11 to ground. While the sense resistor Rsense will typically be a very small resistor, still the voltage of the emitter of transistor Q8 will slightly exceed the voltage of the emitter of transistor Q9 in an amount proportional to the current through the sense resistor. Accordingly, the current through transistor Q8 will generally exceed the current through transistor Q9 because of the common base connection between transistors Q8 and Q9.

The current through transistor Q8 provides a voltage V2b dependent upon the relative value of resistors R11 and R13. Resistors R11 and R13 are equal so that the difference between the voltages V2a and V2b is proportional to the current through the sense resistor. The voltages V2a and V2b are compared by comparator 44 after a small offset voltage VOS is added to the voltage V2a. Consequently, when the current through the sense resistor Rsense becomes excessive, the voltage V2b will exceed the voltage V2a by more than VOS, driving the output of comparator 44 high. This drives one input of NOR gates 46 and 48 high, holding the outputs thereof low, and thus the outputs of NAND gates 50 and 52 high and the outputs of NAND gates 54 and 56 low, the other two inputs thereto normally also being high. As herein before described, holding the input to NOR gate 24 low will hold p-channel output devices P1 and P2 off and will turn on n-channel devices N1 and N2, thus terminating the excessive current through the sense resistor, typically until the next pulse width modulator cycle. Also, the voltage on the collector of transistor Q8 is coupled to switches S1 and S2 of the sampling circuit. This voltage is proportional to the current through the sense resistor Rsense.

The voltage output of the converter is controlled by digital inputs on control input lines D0 through D5. The address input on these terminals address a read only memory 58, which provides a digital output as the input to the multiplying digital to analog converter (MDAC) 60. The analog output of the MDAC is provided as a positive input to a transconductance amplifier 62, the negative input to which is connected to the output voltage Vout. Thus, the transconductance amplifier 62 provides a current output proportional to the differential voltage input thereto with a gain set by external resistor Rgain, the differential input being the error between the output voltage Vout and the voltage commanded by the output of ROM 58 as a result of the digital input D0 through D5. The output current of transconductance amplifier 62 is provided to node 64, which is maintained at one Vbe above the 1.22 volt bias on the base of PNP transistor Q2. Also providing current to node [62] *64* is a current source I1, which is proportional to the target voltage divided by the input voltage V.

The output voltage Vout is also fed back through an external resistor Rint as the negative input to amplifier 66. The positive input to amplifier 66 is maintained at the desired output voltage by the output of the MDAC. With feedback capacitor C3, amplifier 66 acts as an integrator, with an integration time constant of Rint*C3. Thus, the voltage across resistor R7, and consequently the current through R7 to node 64, represents integral feedback of the error between the output voltage Vout and the commanded output voltage.

Further, the output voltage Vout is fed back through external capacitor Cdiff to form the negative input of amplifier 68, which amplifier includes a high frequency filtering capability. The positive input to amplifier 68 is held constant by an internal voltage source Vs. With the capacitive coupled input through capacitor Cdiff, and with the resistive feedback through resistor 78, this part of the circuit acts as a differentiator, the output thereof being proportional to the rate of change of the output voltage Vout.

The output of amplifier 68 is coupled to the negative input of comparators 80 and 82, and to the positive input of transconductance amplifier 84. The negative input of the transconductance amplifier 84 is coupled to the analog voltage V/2 so that the output of the transconductance amplifier 84 is an additional current component into node 64 proportional to the rate of change of the output voltage Vout.

The pulse width modulators in the embodiment shown are driven by an oscillator 86 which may be externally controlled through the integrated circuit pin FREQ. Normally, with pin FREQ grounded, the oscillator will provide a 4 MHZ output, though other frequencies may be chosen by connecting the FREQ pin to the input voltage V, by allowing the pin to float or by actually forcing an external frequency through the FREQ pin. At start-up, when Vout is very low, the output of comparator 100 will cause the controllable divider 88 to divide the frequency output of the oscillator by 4, though in normal operation where Vout is at near the intended regulated voltage, the output of oscillator 86 will not be divided down by divider 88. In the discussion to follow, it will be assumed that the oscillator 86 is providing a 4 MHz output and that divider 88 is not dividing that output down.

The 4 MHz output from the controllable divider 88 is coupled to NAND gate 94, NAND gate 96, flip-flop 90 and to the start-up and overload circuit 22. Flip-flops 90 and 92 are both edge triggered flip-flops, toggled to the opposite state on the trailing edge of a pulse provided thereto. With the connections shown, flip-flop 90 divides the 4 MHz input thereto down to 2 MHz on the Q output thereof, and flip-flop 92 divides the 2 MHz signal from flip-flop 90 down to 1 MHz, providing complementary outputs on the Q and $\overline{Q}$ outputs. Since all three inputs to NAND gate 94 must be high for the output to go low, the output of NAND gate 94 will only go low when the 4 MHz signal, the 2 MHz signal and the 1 MHz signal are all high. This will occur at a 1 MHz rate, each low pulse having a duration of the half period of the 4 MHz signal, namely 0.125 microseconds. The output of NAND gate 96 will have the same characteristics, though because one of the inputs to NAND gate 96 is the $\overline{Q}$ output of flip-flop 92 rather than the Q output, the 0.125 microsecond pulses from NAND gate 96 will also be at 1 MHz, but will be shifted one-half of a 1 MHz cycle with respect to the output of NAND gate 94. Thus the low pulses from NAND gates 94 and 96 are directly out of phase with each other.

Each pulse width modulator PWM has a current source I4 charging a capacitor 98, with an n-channel transistor Q10 connected across each capacitor 98 to controllably discharge the capacitor. Thus, when the output of NAND gate 94 pulses low, the output of inverter 104 will pulse high for 0.125 microseconds, turning on transistor Q10 for a sufficient length of time to discharge the capacitor 98.

The current from node 64 representing the nominal signal, the output gain error signal, the integral of the error signal, and the rate of change of the output voltage Vout, is provided through transistor Q2 to the common connection of the emitters of transistors Q5 and Q6. Because the bases of these two transistors are connected in common to a reference voltage, the current will divide equally through the two transistors, so that half the current will flow through resistors R4a and R4b and the other half will flow through resistors R5a and R5b. In the preferred embodiment, these four resistors are all of the same value, so that by way of example, the voltage at the junction between the resistors R4a and R4b will be one-half the voltage at the collector of transistor Q5.

Also connected to resistors R4a and R5a are the collectors of transistors Q3 and Q4, respectively. The emitters of transistors Q3 and Q4 are connected in common to current source I2, with the bases of transistors Q3 and Q4 being connected to capacitors C1 and C2. Assuming for the moment that the voltages on capacitors C1 and C2 are equal, the current I2 will also divide evenly between transistors Q3 and Q4. Under these conditions, the voltages on lines 106 and 108 will be equal.

When the output of NAND gate 94 pulses low, turning on transistor Q10 to discharge capacitor 98, the output of NAND gate 110 will necessarily be high. Because of the discharge of capacitor 98, the negative input to comparator 112 will be greater than the positive input, driving the output of the comparator low. Assuming the other two inputs to NOR gate 46 are low, both inputs to NAND gate 50 will now be high, driving the output of NAND gate 50 low and the output of NAND gate 54 high to turn on p-channel output transistor P1 through the output driver DRV1. When the output of NAND gate 94 goes high again, transistor Q10 will be turned off, allowing capacitor 98 to start charging. However, because the output of NAND gate 50 is low, the output of NAND gate 110 will be high, independent of the return of the output of NAND gate 94 to the high state.

When capacitor 98 is discharged, the negative input to comparator 114 will be lower than the positive input, holding the output of the comparator high and switch S1 open. When the capacitor charges to a point where the voltage on the negative input to comparator 114 exceeds the voltage on the positive input of the comparator, the output of the comparator will be pulled low, momentarily closing switch S1 to readjust the voltage in capacitor C2 to be proportional to the present voltage across the sense resistor Rsense. As the capacitor 98 continues to charge, the positive input to comparator 112 will ultimately become higher than the negative input, causing the output of comparator 112 to go high. This drives the output of NOR gate 46 low, the output of NAND gate 50 high, and the output of NAND gate 54 low (the output of comparator 82 normally being high), turning off the output power transistor P1 and turning on the output power transistor N1. If, on the next cycle of the pulse width modulator, the output voltage Vout is lower than the commanded voltage, the transconductance amplifier 62 will increase the current through transistor Q2, which in turn will increase the voltage on lines 106 and 108 so that on the interleaved cycles of the dual converter, the p-channel power output devices will stay on longer before being turned off and the n-channel devices turned on.

Because resistors R5a and R5b are equal, the voltage on line 116 will be half the voltage on line 106. Accordingly, switch S1 will close after one-half the ON period of output power transistor P1. Because of the interleaving of the operation of the two pulse width modulators, the sample of the voltage across the resistor Rsense taken by the closing of switch S1 will occur only when output power p-channel device P2 is turned off. In a similar way, switch S2 will sample the voltage from the collector of Q8 only when power transistor P2 is turned on and power transistor P1 is turned off. Thus, the voltages on capacitors C1 and C2 represent a measure of the current in power transistors P2 and P1, respectively. When the current in power transistor P1 is higher than the current in power transistor P2, the sampled voltage will be higher when power transistor P1 is on than when power transistor P2 is on. Thus, when this voltage is sampled by the alternate closing of switches S1 and S2, the voltage on capacitor C2 will exceed the voltage on capacitor C1. A higher voltage on capacitor C2 than on capacitor C1 will reduce the current flow through transistor Q4, and increase the current flow through transistor Q3 by the same amount, reducing the voltage on line 106 and increasing the voltage on line 108. This will have the effect of reducing the ON time of power transistor P1 during its next cycle and increasing the ON time of transistor P2 during its next cycle, thereby adjusting the relative duty cycles between power transistors P1 and P2 to balance the current in the interleaved converters in spite of circuit differences between the two inverters, particularly differences in the power FET ON resistances.

The circuit shown in FIG. 2 includes a load variation circuit 20 which, among other things, responds to the differential voltage output V2A, V2B from the current sense amplifier to adjust the current $I_O$ to the MDAC to adjust its output based upon the voltage across the sense resistor Rsense, which in turn is responsive to the load on the output Vout. In particular, when the load on the output is low, the load variation circuit 20 boosts the output voltage of the MDAC 60 slightly, putting the converter output near the high end of the allowed converter output range. This helps reduce the extent to which the converter output drops below the nominal converter output on the sudden imposition of a large load. Similarly, the load variation circuit will somewhat reduce the MDAC output when the interleaved converter is operating into a heavy load to help reduce the overshoot upon the sudden reduction of the output load. In general, this intentional output voltage variation with output load is known in prior art converters. However, the present invention further incorporates additional circuitry overriding the normal operation of the interleaved converter upon an extraordinary rate of change of the output voltage indicative of an extraordinary change in the load on the converter, either as an increase or as a decrease. In particular, operational amplifier 116 has its negative input connected to the emitter of transistor Q1 and its output connected to the base of the transistor. The positive input to the amplifier is connected to a reference voltage. With this connection, the base of the transistor is driven to a voltage such that the emitter of transistor Q1 will be at the reference voltage. Thus, the current through transistor Q1 may be set by the external resistor R16, the current being equal to the reference voltage divided by the value of the external resistor.

The current through transistor Q1 flows through diode connected p-channel transistor Q11, which mirrors that current to p-channel transistors Q12 and Q13. The current through transistor Q13 is mirrored by n-channel transistor Q14 to n-channel transistor Q15. Since the negative input to transconductance amplifier 84 is equal to V/2, the voltage to the positive inputs of comparators 80 and 82 will equal V/2 decreased by the voltage drop across resistor R15, and increased by the voltage drop across resistor R14, respectively. The voltage drops across resistors R14 and R15 depend upon the current mirrored there through by transistors Q12 and Q15. Thus the voltage at the positive input to comparators 80 and 82 is adjustable by the external resistor R16 coupled to the terminal TSET.

The negative input to comparators 80 and 82 is provided by the output of amplifier 68, which as previously described, provides an output proportional to the rate of change of the output voltage Vout, more specifically, an increasing output voltage for increasing rates in the drop of the output voltage Vout and a decreasing output voltage for increases in the rate of increase of the output voltage Vout. Assume for the moment that a large load is suddenly imposed on the converter, causing the output voltage Vout to begin to rapidly drop. This will drive the output of amplifier 68 sufficiently high to force the output of comparator 82, which is normally high, to go low. This forces the output of NAND gate 54 high, turning off n-channel power device N1 if it was on, and turning on p-channel power device P1, independent of the state of the respective pulse width modulator. Similarly, n-channel power device N2 will be turned off if it was on, and p-channel power device [P1] *P2* will be turned on, independent of the state of that pulse width modulator. Of course, once the rate of drop of the output voltage Vout reduces, the output of comparator 82 will again go high, allowing the interleaved pulse width modulators to resume control of the output devices.

Similarly, if a large load is suddenly removed so that the output voltage Vout starts to rapidly increase, the output of amplifier 68 will drop sufficiently so that the output of comparator 80 will go high. This forces the output of NOR gate 46 to go low, the output of NAND gate 50 to go high, and the output of NAND gate 54 to go low (the other input thereto normally being high), turning off p-channel power device P1 if the same was on, and then turning on n-channel power device N1. In a similar manner, the high output of comparator 80 will simultaneously turn off p-channel power device P2 if the same was on, and turn on n-channel power device N2. Thus, in normal operation the converters operate in an interleaved fashion to provide, in an integrated form, all the herein before stated advantages of interleaved converters. However, in the event of extraordinary rates of change in the converter output voltage Vout, the converters switch to act in unison to respond to the extraordinary conditions, independent of the state of the interleaved pulse width modulators, to minimize the converter output voltage swing with extraordinary changes in load.

Also shown in FIG. 2 is a circuit for monitoring the error between the output of the MDAC and Vout, and for controllably reading the MDAC output. More specifically, the output of the MDAC and Vout are applied as the two inputs to window comparator 120, which provides a high output Voutok whenever the output voltage is within acceptable limits. This signal is applied as one input to NAND gate 122. The second input to NAND gate 122 is the input signal output-enable/$\overline{\text{shutdown}}$ OUTEN/SHDNB. When the output enable signal is low, the output of inverter 124 will be high, providing the shut down signal SHDN to shut down the rest of the circuit (the details of shut down circuitry in general are well known in the prior art and not part of the invention claimed herein). When the output enable signal is high, both inputs to NAND gate 122 will be high if the error signal is within acceptable limits, making the output of NAND gate 122 low, holding the output of AND gate 126 low and holding transistor Q16 off. Under these conditions, inverter 130 provides a high signal to the startup and overload circuit 22, indicating that the error signal is within acceptable limits. If the error signal moves out of acceptable limits, the signal Voutok will go low, driving the output of NAND gate 122 high. Since the high state of the output enable signal is substantially equal to the analog voltage V, transistor Q7 will be off so that the resistor [R16] *R18* will pull the input to inverter 134 low. This forces the second input to AND gate 126 high also, turning on transistor Q16 to indicate to the system connected thereto that the error signal between the commanded output voltage and the then existing output voltage is excessive.

For test purposes, the output enable signal may be driven above the analog voltage V so as to turn on transistor Q7. This pulls the input to inverter 134 high, driving the output of the inverter low, in turn making the output of AND gate 126 low and holding transistor Q16 off. The high voltage on the input to inverter 134 also controls a multiplexer 136 to couple the output of the MDAC to the output pin PWRGD. Thus, the output pin PWRGD can be used for test purposes, to monitor the output of the MDAC to verify that the MDAC and the control thereto is working as intended. Driving the output enable signal above the analog voltage V, of course, does not otherwise affect the operation of the circuit, so that normal circuit operation will continue without interruption.

The preferred embodiment of the present invention has been disclosed with respect to interleaved buck converters for purposes of specificity in the illustrative embodiment. The principles of the invention are not limited to such [inverters] *converters*, however, and may also readily be adapted to boost or step up converters by one of ordinary skill in the art. Similarly, while a dual interleaved [inverter] *converter* has been disclosed, the principles of the invention may be applied to interleaved converters having more than two converters being interleaved. Thus while a certain exemplary embodiment has been described in detail and shown in the accompanying drawings, it is to be understood that such embodiment is merely illustrative of and not restrictive on the broad invention, and that this invention is not to be limited to the specific arrangements and constructions shown and described, since various other modifications may occur to those with ordinary skill in the art.

What is claimed is:

1. A DC to DC switching circuit for controlling power switching devices in a DC to DC converter having first and second interleaved converter circuits operating into a common load comprising:

a current sense circuit sensing the voltage across a sense resistor in series with the power supply supplying power to the power switching devices;

a first pulse width modulator controlling the power switching devices of the first converter circuit;

a second pulse width modulator controlling the power switching devices of the second converter circuit;

a feedback circuit responsive to the voltage across the common load;

control circuits for controlling the first and second pulse width modulators responsive to the feedback circuit and a commanded output voltage;

the control circuits also being responsive to the difference in the voltage across the sense resistor when the first converter is drawing power from the power supply through the sense resistor and the second converter is not, and when the second converter is drawing power from the power supply through the sense resistor and the first converter is not, to adjust the relative duty cycle of the first and second converters to tend to minimize the difference in the voltage across the sense resistor;

the current sense circuit, the first pulse width modulator, the second pulse width modulator, the feedback circuit and the control circuits being in a single integrated circuit.

2. The DC to DC switching circuit of claim 1 wherein the sense resistor is external to the integrated circuit.

3. The DC to DC switching circuit of claim 1 further comprised of an integrator having an output responsive to the integral of an error signal, the error signal being responsive to the voltage across the common load and a desired voltage, the control circuits also being responsive to the output of *the* integrator.

4. The DC to DC switching circuit of claim 3 wherein the time constant of the integrator is adjustable by the selection of at least one component external to the integrated circuit.

5. The DC to DC switching circuit of claim 3 further comprised of a differentiator having an output responsive to the rate of change of the voltage across the common load, the control circuits also being responsive to the output of differentiator.

6. The DC to DC switching circuit of claim 5 wherein the time constant of the differentiator is adjustable by the selection of at least one component external to the integrated circuit.

7. The DC to DC switching circuit of claim 1 wherein the control circuits are also responsive to rapid decreases in the voltage on the common load to turn on the first and second converter circuits independent of the phase of the first and second pulse width modulators.

8. The DC to DC switching circuit of claim 7 wherein the control circuits are also responsive to rapid increases in the voltage on the common load to turn off the first and second converter circuits independent of the phase of the first and second pulse width modulators.

9. The DC to DC switching circuit of claim 1 further comprised of a load variation circuit coupled to the control circuits to decrease the voltage on the common load for higher voltages across the current sense resistor and to increase the voltage on the common load for lower voltages across the current sense resistor.

10. DC to DC switching circuit for controlling power switching devices in a DC to DC converter having first and second [interleaved] converter circuits operating into a common load comprising:

a first pulse width modulator controlling the power switching devices of the first converter circuit;

a second pulse width modulator controlling the power switching devices of the second converter circuit;

a feedback circuit responsive to the voltage across the common load;

control circuits for controlling the first and second pulse width modulators responsive to the feedback circuit, *the operation of the first and second pulse width modulators being interleaved*;

the control circuits also being responsive to the difference in [current] *currents* through the first converter and the second converter to adjust the relative duty cycle of the first and second converters to tend to minimize the difference in the voltage across [the] *a* sense resistor;

[the current sense circuit,] the first pulse width modulator, the second pulse width modulator, the feedback circuit and the control circuits being in a single integrated circuit.

11. The DC to DC switching circuit of claim 10 wherein the commanded output voltage is controllable through an input to the integrated circuit.

12. The DC to DC switching circuit of claim 10 wherein the commanded output voltage is controllable through a digital input to the integrated circuit.

13. The DC to DC switching circuit of claim 12 further comprised of an integrator having an output responsive to the integral of an error signal, the error signal being responsive to the voltage across the common load and a desired voltage, the control circuits also being responsive to the output of *the* integrator.

14. The DC to DC switching circuit of claim 13 wherein the time constant of the integrator is adjustable by the selection of at least one component external to the integrated circuit.

15. The DC to DC switching circuit of claim 13 further comprised of a differentiator having an output responsive to the rate of change of the voltage across the common load, the control circuits also being responsive to the output of differentiator.

16. The DC to DC switching circuit of claim 15 wherein the time constant of the differentiator is adjustable by the selection of at least one component external to the integrated circuit.

17. The DC to DC switching circuit of claim 12 wherein the control circuits are also responsive to rapid decreases in the voltage on the common load to turn on the first and second converter circuits independent of the phase of the first and second pulse width modulators.

18. The DC to DC switching circuit of claim 17 wherein the control circuits are also responsive to rapid increases in the voltage on the common load to turn off the first and second converter circuits independent of the phase of the first and second pulse width modulators.

19. The DC to DC switching circuit of claim 12 further comprised of a load variation circuit coupled to the control circuits to decrease the voltage on the common load for higher currents through the converters and to increase the voltage on the common load for lower currents through the converters.

20. The DC to DC switching circuit of claim 12 wherein the commanded output voltage is controllable through an input to the integrated circuit.

21. The DC to DC switching circuit of claim 12 wherein the commanded output voltage is controllable through a digital input to the integrated circuit.

*22. A DC to DC converter having a plurality of converter circuits for operating into a common load, comprising:*

*a plurality of buck converter circuits operating into the common load, each buck converter circuit having an inductor for alternately conducting between the first power supply terminal and the common load, and the second power supply terminal and the common load;*

*a plurality of pulse width modulators driven by a common oscillator in an interleaved manner, each pulse width modulator controlling one of the plurality of buck converter circuits, whereby the operation of the buck converter circuits is interleaved;*

*a feedback circuit responsive to a voltage across the common load;*

*a voltage control circuit controlling the plurality of pulse width modulators responsive to the feedback circuit and a commanded output voltage; and*

*a current balance control circuit responsive to the difference in currents in the plurality of interleaved buck converter circuits and controlling the pulse width modulators to balance the currents in the plurality of interleaved buck converter circuits;*

*the plurality of pulse width modulators and the control circuits being in a single integrated circuit.*

*23. The DC to DC converter of claim 22 further comprised of an integrator having an output responsive to the integral of an error signal, the error signal being responsive to the voltage across the common load and a desired voltage, the control circuits also being responsive to the output of the integrator.*

*24. The DC to DC converter of claim 23 wherein a time constant of the integrator is adjustable by the selection of at least one component external to the integrated circuit.*

*25. The DC to DC converter of claim 23 further comprised of a differentiator having an output responsive to the rate of change of the voltage across the common load, the control circuits also being responsive to the output of differentiator.*

*26. The DC to DC converter of claim 25 wherein the time constant of the differentiator is adjustable by the selection of at least one component external to the integrated circuit.*

*27. The DC to DC converter of claim 22 wherein the control circuits are also responsive to rapid decreases in the voltage across the common load to turn on the plurality of buck converter circuits independent of the phase of the plurality of pulse width modulators.*

*28. The DC to DC converter of claim 27 wherein the control circuits are also responsive to rapid increases in the voltage across the common load to turn off the plurality of buck converter circuits independent of the phase of the plurality of pulse width modulators.*

*29. The DC to DC converter of claim 22, wherein the plurality of pulse width modulators consist of a pair of pulse width modulators.*

*30. The DC to DC converter of claim 22 wherein the feedback circuit is in the single integrated circuit.*

*31. A DC to DC converter having a plurality of converter circuits operating into a common load, comprising:*

*a plurality of buck converter circuits operating into the common load, each buck converter circuit having an inductor for alternately conducting between the first power supply terminal and the common load, and the second power supply terminal and the common load;*

*a plurality of pulse width modulators each controlling one of the plurality of buck converter circuits, the operation of the pulse width modulators and the buck converter circuits being interleaved;*

*a feedback circuit responsive to a voltage across the common load;*

*control circuits responsive to the feedback circuit and a commanded output voltage to control a nominal duty cycle of the plurality of buck converter circuits, the control circuits also being responsive to the difference in currents in the plurality of interleaved buck converter circuits to adjust relative duty cycles of the plurality of buck converter circuits to balance the currents in the buck converter circuits;*

*the plurality of pulse width modulators and the control circuits being in a single integrated circuit.*

*32. The DC to DC converter of claim 31 wherein the control circuits control the plurality of pulse width modulators.*

*33. The DC to DC converter of claim 31 further comprising an integrator having an output responsive to the integral of an error signal, the error signal being responsive to the voltage across the common load and a desired voltage.*

*34. The DC to DC converter of claim 33, wherein the control circuits are also responsive to the output of the integrator.*

*35. The DC to DC converter of claim 33 wherein a time constant of the integrator is adjustable by the selection of at least one component external to the integrated circuit.*

*36. The DC to DC converter of claim 33 further comprising a differentiator having an output responsive to a rate of change of the voltage across the common load, the control circuits also being responsive to the output of differentiator.*

*37. The DC to DC converter of claim 36 wherein a time constant of the differentiator is adjustable by the selection of at least one component external to the integrated circuit.*

*38. The DC to DC converter of claim 31 wherein the control circuits are also responsive to rapid decreases in the voltage across the common load to turn on the plurality of buck converter circuits, independent of the phase of the plurality of pulse width modulators.*

*39. The DC to DC converter of claim 31 wherein the control circuits are also responsive to rapid increases in the voltage across the common load to turn off the plurality of buck converter circuits, independent of the phase of the plurality of pulse width modulators.*

*40. The DC to DC converter of claim 31, wherein the plurality of pulse width modulators consist of a pair of pulse width modulators.*

*41. The DC to DC converter of claim 31 wherein the commanded output voltage is controllable through an input to the integrated circuit.*

*42. The DC to DC converter of claim 31 wherein the feedback circuit is in the single integrated circuit.*

*43. A DC to DC converter having a plurality of converter circuits operating into a common load, comprising:*

*a plurality of buck converter circuits operating into the common load, each buck converter circuit having an inductor for alternately conducting between the first power supply terminal and the common load, and the second power supply terminal and the common load;*

*a plurality of pulse width modulators each controlling one of the plurality of buck converter circuits, the operation of the pulse width modulators being interleaved;*

*control circuits for adjusting a nominal duty cycle of the plurality of interleaved buck converter circuits, the control circuits also being responsive to the difference in currents in the plurality of interleaved buck converter circuits to adjust the relative duty cycles of the plurality of buck converter circuits to balance the currents therein;*

*the plurality of pulse width modulators and the control circuits being in a single integrated circuit.*

*44. A DC to DC converter having first and second converter circuits operating into a common load, comprising:*

*first and second buck converter circuits operating into the common load, each buck converter circuit having an inductor for alternately conducting between the first power supply terminal and the common load, and the second power supply terminal and the common load;*

*a first pulse width modulator controlling the first buck converter circuit;*

*a second pulse width modulator controlling the second buck converter circuit;*

*a feedback circuit responsive to the voltage across the common load;*

*control circuits for controlling the first and second pulse width modulators responsive to the feedback circuit;*

*the control circuits also being responsive to current measurements in the first buck converter circuit and the second buck converter circuit for adjusting the relative duty cycle of the first and second pulse width modulators to balance the currents in the buck converter circuits;*

*the first pulse width modulator, the second pulse width modulator, the feedback circuit and the control circuits being in a single integrated circuit.*

*45. A DC to DC converter having a plurality of converter circuits operating into a common load, comprising:*

*a plurality of buck converter circuits operating into the common load, each buck converter circuit having an inductor for alternately conducting between the first power supply terminal and the common load, and the second power supply terminal and the common load;*

*a plurality of pulse width modulators driven by a common oscillator in an interleaved manner, each pulse width modulator controlling one of the plurality of buck converter circuits, whereby the operation of the buck converter circuits is interleaved;*

*a feedback circuit responsive to a voltage across the common load;*

*a voltage control circuit for controlling the plurality of pulse width modulators responsive to the feedback circuit and a commanded output voltage; and*

*a current balance control circuit responsive to the difference in currents in the plurality of interleaved buck converter circuits for controlling the pulse width modulators to balance the currents in the plurality of interleaved buck converter circuits;*

*the plurality of pulse width modulators, the feedback circuit, the voltage control circuit and the current balance control circuit being in a single integrated circuit.*

*46. A DC to DC converter having a plurality of converter circuits operating into a common load, comprising:*

*a plurality of buck converter circuits operating into the common load, each buck converter circuit having an inductor for alternately conducting between the first power supply terminal and the common load, and the second power supply terminal and the common load;*

*a plurality of pulse width modulators each controlling power switching devices of one of the plurality of interleaved buck converter circuits, the operation of the pulse width modulators and the buck converter circuits being interleaved;*

*a feedback circuit responsive to a voltage across the common load;*

*control circuits responsive to the feedback circuit and a commanded output voltage to control a nominal duty cycle of the plurality of buck converter circuits, the control circuits also being responsive to the difference in currents in the plurality of interleaved buck converter circuits to adjust the relative duty cycles of the plurality of buck converter circuits to balance the currents in the buck converter circuits;*

*the plurality of pulse width modulators, the feedback circuit and the control circuits being in a single integrated circuit.*

*47. A DC to DC converter having a plurality of converter circuits operating into a common load, comprising:*

*a plurality of buck converter circuits operating into the common load, each buck converter circuit having an inductor for alternately conducting between the first power supply terminal and the common load, and the second power supply terminal and the common load;*

*a plurality of pulse width modulators each controlling one of the plurality of buck converter circuits, the pulse width modulators being driven by a common oscillator signal so that the operation of the pulse width modulators is interleaved;*

*control circuits for adjusting a nominal duty cycle of the plurality of interleaved buck converter circuits to control a voltage on the common load, and for responding to the difference in currents in the plurality of interleaved buck converter circuits to adjust the relative duty cycles of the plurality of buck converter circuits to balance the currents in the buck converter circuits;*

*the plurality of pulse width modulators and the control circuits being in a single integrated circuit.*

*48. A DC to DC converter having first and second converter circuits operating into a common load, comprising:*

*first and second buck converter circuits operating into the common load, each buck converter circuit having an inductor for alternately conducting between the first power supply terminal and the common load, and the second power supply terminal and the common load;*

*a first pulse width modulator controlling the first buck converter circuit;*

*a second pulse width modulator controlling the second buck converter circuit;*

*a feedback circuit responsive to the voltage across the common load;*

*control circuits for controlling the first and second pulse width modulators responsive to the feedback circuit;*

*the control circuits also being responsive to current measurements in the first buck converter circuit and the second buck converter circuit to adjust the relative duty cycle of the first and second buck converter circuits*

*the first pulse width modulator, the second pulse width modulator and the control circuits being in a single integrated circuit.*

*49. A DC to DC converter comprising:*

*a plurality of buck converter circuits operating into the common load, each buck converter circuit having an inductor for alternately conducting between the first power supply terminal and the common load, and the second power supply terminal and the common load;*

*a plurality of pulse width modulators driven by a common oscillator in an interleaved manner, each pulse width modulator controlling one of the plurality of buck converter circuits, whereby the operation of the buck converter circuits is interleaved;*

*a feedback circuit responsive to a voltage on the common output;*

*a voltage control circuit for controlling the plurality of pulse width modulators responsive to the feedback circuit and a commanded output voltage; and*

*a current balance control circuit for controlling the pulse width modulators responsive to a difference in currents in the inductors of the plurality of interleaved buck converter circuits to balance the currents in the plurality of interleaved buck converter circuits;*

*the plurality of pulse width modulators and the control circuits being in a single integrated circuit.*

*50. A DC to DC converter having a plurality of converter circuits operating into a common load, comprising:*

*a plurality of buck converter circuits operating into the common load, each buck converter circuit having an inductor for alternately conducting between the first power supply terminal and the common load, and the second power supply terminal and the common load;*

*a plurality of pulse width modulators each controlling power switching devices of one of the plurality of buck converter circuits, the operation of the pulse width modulators and the buck converter circuits being interleaved;*

*a feedback circuit responsive to a voltage across the common load;*

*control circuits being responsive to the feedback circuit and a commanded output voltage to control a nominal duty cycle of the plurality of buck converter circuits, the control circuits also being responsive to the difference in currents in the plurality of interleaved buck converter circuits to adjust the relative duty cycles of the plurality of buck converter circuits to balance the currents in the buck converter circuits;*

*the plurality of pulse width modulators and the control circuits being in a single integrated circuit.*

*51. A DC to DC converter having first and second converter circuits operating into a common load, comprising:*

*first and second buck converter circuits operating into the common load, each buck converter circuit having an inductor for alternately conducting between the first power supply terminal and the common load, and the second power supply terminal and the common load;*

*a first pulse width modulator controlling the first buck converter circuit;*

*a second pulse width modulator controlling the second buck converter circuit;*

*a feedback circuit responsive to the voltage across the common load;*

*control circuits for controlling the first and second pulse width modulators responsive to the feedback circuit;*

*the control circuits also being responsive to current measurements in the first buck converter circuit and the second buck converter circuit to adjust the relative duty cycle of the first and second buck converter circuits;*

*the first pulse width modulator, the second pulse width modulator, the feedback circuit and the control circuits being in a single integrated circuit.*

*52. A DC to DC converter having a plurality of converter circuits operating into a common load, comprising:*

*a plurality of buck converter circuits operating into the common load, each buck converter circuit having an inductor for alternately conducting between the first power supply terminal and the common load, and the second power supply terminal and the common load;*

*a plurality of pulse width modulators driven by a common oscillator in an interleaved manner, each pulse width modulator controlling one of the plurality of buck converter circuits, whereby the operation of the buck converter circuits is interleaved;*

*a feedback circuit responsive to a voltage across the common load;*

*a voltage control circuit for controlling the plurality of pulse width modulators responsive to the feedback circuit and a commanded output voltage; and*

*a current balance control circuit for controlling the pulse width modulators to balance the currents in the plurality of interleaved buck converter circuits responsive to the difference in currents in the plurality of interleaved buck converter circuits;*

*the plurality of pulse width modulators, the voltage control circuit and the current balance control circuit being in a single integrated circuit.*

*53. A DC to DC converter having a plurality of converter circuits operating into a common load, comprising:*

*a plurality of buck converter circuits operating into the common load, each buck converter circuit having an inductor for alternately conducting between the first power supply terminal and the common load, and the second power supply terminal and the common load;*

*a plurality of pulse width modulators each controlling power switching devices of one of the plurality of interleaved buck converter circuits, the operation of the pulse width modulators and the buck converter circuits being interleaved;*

*a feedback circuit responsive to a voltage across the common load;*

*control circuits responsive to the feedback circuit and a commanded output voltage to control a nominal duty cycle of the plurality of buck converter circuits, the control circuits also adjusting relative duty cycles of the plurality of buck converter circuits to balance the currents in the buck converter circuits responsive to the difference in currents in the plurality of interleaved buck converter circuits;*

*the plurality of pulse width modulators and the control circuits being in a single integrated circuit.*

*54. A DC to DC converter having a plurality of converter circuits operating into a common load, comprising:*

*a plurality of buck converter circuits operating into the common load, each buck converter circuit having an inductor for alternately conducting between the first power supply terminal and the common load, and the second power supply terminal and the common load;*

*a plurality of pulse width modulators each controlling one of the plurality of buck converter circuits, the pulse width modulators being driven by a common oscillator signal so that the operation of the pulse width modulators is interleaved;*

*control circuits for adjusting a nominal duty cycle of the plurality of interleaved buck converter circuits to control a voltage on the common load, and for adjusting relative duty cycles of the plurality of buck converter circuits to balance the currents in the buck converter circuits;*

*the plurality of pulse width modulators and the control circuits being in a single integrated circuit.*

*55. A DC to DC converter having first and second buck converter circuits operating into a common load, comprising:*

*first and second buck converter circuits operating into the common load, each buck converter circuit having an inductor for alternately conducting between the first power supply terminal and the common load, and the second power supply terminal and the common load;*

*a first pulse width modulator controlling the first buck converter circuit;*

*a second pulse width modulator controlling the second buck converter circuit;*

*a feedback circuit responsive to the voltage across the common load;*

*control circuits for controlling the first and second pulse width modulators responsive to the feedback circuit;*

*the control circuits also being responsive to current measurements in the first buck converter circuit and the second buck converter circuit to adjust the relative duty cycle of the first and second pulse width modulators to balance the currents in the buck converter circuits;*

*the first pulse width modulator, the second pulse width modulator and the control circuits being in a single integrated circuit.*

*56. A DC to DC converter having a plurality of converter circuits for operating into a common load, comprising:*

*a plurality of buck converter circuits operating into the common load, each buck converter circuit having an inductor for alternately conducting between the first power supply terminal and the common load, and the second power supply terminal and the common load;*

*a plurality of pulse width modulators driven by a common oscillator in an interleaved manner, each pulse width modulator controlling one of the plurality of buck converter circuits, whereby the operation of the buck converter circuits is interleaved;*

*a feedback circuit responsive to a voltage on the common output;*

*a voltage control circuit for controlling the plurality of pulse width modulators responsive to the feedback circuit and a commanded output voltage;*

*the plurality of pulse width modulators and the control circuits being in a single integrated circuit.*

*57. The DC to DC converter of claim 56 further comprising the common oscillator, the common oscillator also being in the single integrated circuit.*

*58. A DC to DC converter having a plurality of converter circuits operating into a common load, comprising:*

*a plurality of buck converter circuits operating into the common load, each buck converter circuit having an inductor for alternately conducting between the first power supply terminal and the common load, and the second power supply terminal and the common load;*

*a plurality of pulse width modulators each controlling one of the plurality of buck converter circuits, the operation of the pulse width modulators and the buck converter circuits being interleaved;*

*a feedback circuit responsive to a voltage across the common load;*

*control circuits responsive to the feedback circuit and a commanded output voltage to control a nominal duty cycle of the plurality of buck converter circuits;*

*the plurality of pulse width modulators and the control circuits being in a single integrated circuit.*

*59. The DC to DC converter of claim 58 further comprising the common oscillator, the common oscillator also being in the single integrated circuit.*

*60. A DC to DC converter comprising:*

*first and second buck converter circuits operating into a common load, each buck converter circuit having an inductor for alternately conducting between the first power supply terminal and the common load, and the second power supply terminal and the common load;*

*first and second pulse width modulators driven by a common oscillator in an interleaved manner, each pulse width modulator controlling a respective one of the first and second buck converter circuits, whereby the operation of the buck converter circuits is interleaved;*

*a feedback circuit responsive to the voltage across the common output;*

*a voltage control circuit controlling the first and second pulse width modulators responsive to the feedback circuit and a commanded output voltage;*

*the plurality of pulse width modulators and the control circuits being in a single integrated circuit.*

*61. The DC to DC converter of claim 60 further comprising the common oscillator, the common oscillator also being in the single integrated circuit.*

*62. A DC to DC converter comprising:*

*first and second buck converter circuits operating into a common load, each buck converter circuit having an inductor for alternately conducting between the first power supply terminal and the common load, and the second power supply terminal and the common load;*

*first and second pulse width modulators each controlling a respective one of the buck converter circuits, the operation of the pulse width modulators and the buck converter circuits being interleaved;*

*a feedback circuit responsive to the voltage across the common load;*

*control circuits responsive to the feedback circuit and a commanded output voltage to control a nominal duty cycle of the plurality of buck converter circuits;*

*the plurality of pulse width modulators and the control circuits being in a single integrated circuit.*

*63. The DC to DC converter of claim 62 further comprising the common oscillator, the common oscillator also being in the single integrated circuit.*

* * * * *